United States Patent [19]
Leriche et al.

[11] Patent Number: 6,048,619
[45] Date of Patent: Apr. 11, 2000

[54] METHOD FOR ADHERING A POLYURETHANE TO A POLYMERIC SUBSTRATE

[75] Inventors: Christian Gustave Alain Leriche, Trets; Joel Alain Jerome Turin, Marseilles, both of France

[73] Assignee: Gemplus S.C.A., Gemenos, France

[21] Appl. No.: 09/043,525

[22] PCT Filed: Sep. 20, 1996

[86] PCT No.: PCT/FR96/01475

§ 371 Date: Mar. 20, 1998

§ 102(e) Date: Mar. 20, 1998

[87] PCT Pub. No.: WO97/11104

PCT Pub. Date: Mar. 27, 1997

[30] Foreign Application Priority Data

Sep. 20, 1995 [FR] France ................................. 95 11054

[51] Int. Cl.7 ........................... B32B 27/00; B32B 27/40
[52] U.S. Cl. .................... 428/423.1; 428/195; 156/60; 156/331.7; 427/412.1; 427/412.4; 427/369
[58] Field of Search .................... 156/60, 331.7; 428/423.1, 195; 427/412.1, 412.4, 369

[56] References Cited

U.S. PATENT DOCUMENTS

| 3,813,380 | 5/1974 | Bock | 260/77.5 |
|---|---|---|---|
| 4,373,081 | 2/1983 | Nachtkamp et al. | 528/45 |
| 4,424,834 | 1/1984 | Sumi et al. | 138/121 |
| 4,436,784 | 3/1984 | Ehrhart | 428/423.1 |
| 5,356,717 | 10/1994 | Choki et al. | 428/425.9 |

FOREIGN PATENT DOCUMENTS

| 0399311 | of 1990 | European Pat. Off. . |
| 0411432 | of 1991 | European Pat. Off. . |
| 2314161 | of 1974 | Germany . |
| 1166746 | of 1969 | United Kingdom . |
| 2138016 | of 1984 | United Kingdom . |
| 9427746 | of 1994 | WIPO . |

*Primary Examiner*—William Krynski
*Assistant Examiner*—B. Shewareged
*Attorney, Agent, or Firm*—Roland Plottel

[57] ABSTRACT

Method of bonding a polyurethane surface to a polyvinyl chloride or other polymer substrate containing surface moisture, particularly useful for making chip cards. A resin comprising a polyol and a diisocyanate is placed on the substrate, followed by pressing, in the presence of a tertiary amine catalyst able simultaneously to catalyze the reaction of the polyol with the diisocyanate to form a polyurethane network and the reaction of the surface moisture with the diisocyanate to convert water molecules into polyurea.

22 Claims, No Drawings

METHOD FOR ADHERING A POLYURETHANE TO A POLYMERIC SUBSTRATE

The invention relates to a method of attaching a bicomponent polyurethane surface to a polymer substrate. This method applies to the domain of bonding two polymers, particularly for manufacturing smart cards with and/or without projecting contacts.

Current methods of bonding bicomponent polyurethane (PU) to a polymer substrate consist of placing a resin on the substrate, said resin comprising the two components necessary for forming the PU, namely a polyol and a diisocyanate, and pressing them for several minutes.

However, the bonds obtained by these methods are not of very good quality. This is because molecular water layers present at the substrate surface create a screen between the substrate and the polyurethane. This screen prevents formation of hydrogen and/or Van der Walls bonds between the polyurethane and the substrate, which are necessary for obtaining a good-quality bond. The polyurethane hardening agent, i.e. the diisocyanate, tends to react both with the polyol of the polyurethane composition and with the surface moisture.

The first solution that immediately comes to mind to allow good bonding of the polyurethane on the substrate without interference by the surface moisture consists of using a resin wherein the diisocyanate is in excess relative to the polyol. In this way, the polyol can be made to react fully with the diisocyanate and the surface moisture to react with the excess diisocyanate. However, secondary reaction products form in this case, such as urea or biuret bridges, which also form a screen at the interface between the PU and the substrate and are thus detrimental to a good-quality bond.

A second solution, in current use, consists of using a specific catalyst to avoid over-reactivity of the surface moisture of the substrate with the diisocyanate and on the contrary to increase the kinetics of the reaction between the polyol and the diisocyanate. Thus, the reaction between the polyol and the diisocyanate is favored over the reaction between the moisture and the diisocyanate. The specific catalyst used is dibutyltin dilaurate. However, this solution is unsatisfactory since some moisture still remains at the substrate surface, forming a screen between the polyurethane and the substrate, so that it is impossible to obtain a good-quality bond.

The present invention overcomes all the disadvantages listed above since it provides a method for bonding a bicomponent polyurethane surface to a polymer substrate, consisting of placing on the substrate a resin comprising a polyol and a diisocyanate, which are necessary for forming polyurethane, and pressing them, wherein a specific catalyst able simultaneously to catalyze the reaction between the polyol and the diisocyanate and the reaction between the surface moisture and the diisocyanate is used.

For this purpose, one characteristic of the method according to the invention consists of using a catalyst chosen from the tertiary amines.

According to another characteristic of the invention, the catalyst used is diazobicyclo[2.2.2]octane (Dabco).

According to another characteristic of the invention, the substrate material is chosen from the polymers that have hydrogen bonds with the PU.

The method according to the present invention overcomes all the disadvantages linked to the surface moisture of the substrate. Hence, it eliminates the screen formed by the water molecules at the interface between the substrate and the polyurethane, thus considerably improving the quality of the bond.

Dabco is generally used as a foaming agent to make polyurethane foams. On the other hand, it has never been used in areas other than foams, such as bonding two polymers for example.

Other features and advantages of the invention will emerge from reading the description provided as an illustrative and nonlimiting example.

One embodiment of the method according to the invention consists, first, of placing a resin on a polymer substrate, said resin comprising a catalyst and the two components necessary for forming the polyurethane network by polycondensation, namely a polyol and a diisocyanate. Second, the resin and the substrate are pressed for several minutes.

Water molecules are constantly present at the substrate surface. Their presence is due not only to hydrogen and Van der Walls bonds that are created between these molecules and the substrate, but also to the presence, in certain polymer substrates such as polyvinyl chloride (PVC) substrates for example, of calcium carbonate which has the property of being hygroscopic. These water molecules are reactive to the diisocyanate in the polyurethane composition.

The use of the catalyst, in the method according to the present invention, is essential because, advantageously, it acts simultaneously at the interface between the two polymer surfaces and in the polyurethane network at the time it is formed. It thus increases both the kinetics of the reaction between the diisocyanate and the polyol to form the PU network and the kinetics of the reaction between the diisocyanate and the water molecules present at the surface of the polymer substrate. In this way, the moisture screen that might form at the interface between the polyurethane and the substrate is eliminated, improving the quality of the bond between the two polymers. This screen is in fact eliminated by converting the water molecules into polyurea. Thus, since polyurea is compatible with polyurethane, it forms an integral part of its structure. The moisture screen having been eliminated, intermolecular hydrogen and/or Van der Walls bonds necessary for adhesion can then form at the interface between the polyurethane and the substrate.

Advantageously, the catalyst used in the method according to the present invention is dissolved in the polyol of the resin composition and is chosen from the tertiary amines. This is because tertiary amines $(R)_3N$ are good catalysts for the reactions between the diisocyanate and the water and between the diisocyanate and the polyol.

The reaction between the diisocyanate and the polyol forms the polyurethane network, according to the following equation:

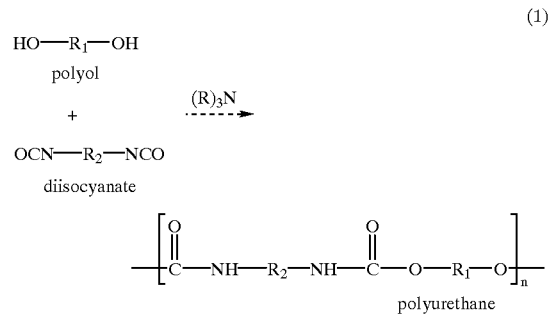

This equation shows that the ideal stoichiometry for optimum reactive effectiveness during polyurethane formation is equal to 1: one mole of polyol reacts with one mole of diisocyanate.

The tertiary amine $(R)_3N$ simultaneously catalyzes the reaction between diisocyanate and water to cause the moisture screen to disappear by converting it to polyurea, which is compatible with the PU structure. The reaction involved is the following:

(2)

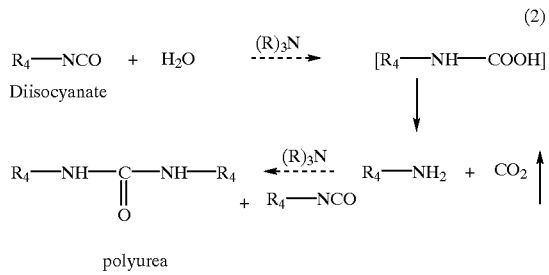

polyurea

From this equation, we see that, to form the polyurea, two moles of diisocyanate are required per mole of water $(N_{H2O}/n_{NCO}=1/2)$. Carbamic acid, an unstable substance noted between brackets in equation (2), forms during the reaction.

Preferably, the tertiary amine used as the specific catalyst is diazobicyclo[2.2.2]octane (Dabco). The bond between the polymer substrate and the polyurethane is made possible by hydrogen and/or Van der Walls bonds created at the interface between these two polymers. Hence, the polymer substrate is advantageously chosen from the polymers having hydrogen bonds with the polyurethane. Thus, for example, the substrate is made of polyvinyl chloride (PVC) or acrylonitrile-butadiene-styrene (ABS) or polycarbonate (PC).

Since the diisocyanate reacts both with the polyol and with the moisture present at the substrate surface, it is important to calculate its proportions to preserve ideal stoichiometry relative to the polyol and allow optimum reactive effectiveness when the PU forms.

Without taking water into account, the diisocyanate and the polyol have identical stoichiometry since, according to equation (1), one mole of diisocyanate reacts with one mole of polyol to form polyurethane.

On the other hand, when surface moisture is present, it is necessary to add a little more diisocyanate to preserve identical stoichiometry between the polyol and the diisocyanate. Thus, the number of moles of diisocyanate, where moisture is present, is advantageously approximately 5% to 15% higher, preferably 8% to 12% higher, than the number of diisocyanate moles in the absence of moisture.

An example of calculating the proportions of diisocyanate necessary for formation of the polyurethane network and elimination of the moisture screen is described below. In this example, the adhesion method according to the invention is implemented during manufacture of a smart card with no projecting contacts, comprising a card body and an electronic module consisting of an integrated circuit chip connected to an antenna. Card manufacture proceeds, in known fashion, in several steps, consisting of placing a frame on a lower polymer sheet to delimit the edges of a cavity, positioning the electronic module at the bottom of the cavity, filling this resin cavity able to form the polyurethane network by polymerization, and finally covering the frame and the cavity with an upper polymer sheet to which a slight pressure is applied.

The two sheets, lower and upper, are made for example of polyvinyl chloride (PVC) and the resin components necessary for forming the PU network are for example a polyester-ether-polyol and diphenylmethane diisocyanate (MDI).

The dimensions of each PVC sheet are 315×143×0,20 mm (millimeter) corresponding to a surface area of $315 \times 143 \times 10^{-4} = 450.5$ cm$^2$. The dimensions of the cavity are 270×90×0.430 mm, corresponding to a surface area of $270 \times 90 \times 10^{-4} = 243$ cm$^2$. Moreover, the weight of a PVC sheet is 12.27 g.

The table below shows the weights m in g (grams) of the hydroxyl (OH) and isocyanate (NCO) groups determined respectively per gram of polyol and of MDI. The molecular weights M of these OH and NCO groups are known, so that the number of moles n of OH and of NCO could be calculated respectively for one gram of polyol and one gram of MDI.

| $m_{OH}$/g of polyol | $m_{OH}$ | $n_{OH}$/g of polyol | $m_{NCO}$/g of MDI | $M_{NCO}$ | $n_{NCO}$/g of MDI |
|---|---|---|---|---|---|
| 0.02512 g | 17 g | $1.478 \times 10^{-3}$ | 0.31 g | 42 g | $7.38 \times 10^{-3}$ |

From the data in this table, it can be deduced that:

1 mole of OH represents 17/0.02512=676.6 g of polyol and 1 mole of NCO represents 42/0.31=135.5 g of MDI.

In the absence of water and according to equation (1), the ratio between the number of moles of polyol and the number of moles of MDI, namely the ratio between the number of moles in the OH group and the number of moles in the NCO group, is: $n_{OH}/n_{NCO}=1/1$. The weight ratio of polyol/MDI then becomes equal to: 676.6/135.5=100/20. Hence, in the absence of moisture, 20 g of MDI has to be mixed with 100 g of polyol to obtain ideal stoichiometry for forming the polyurethane network with optimum reactive effectiveness.

In the presence of moisture, it is preferable to preserve this identical stoichiometry between the polyol and the MDI. If there is 0.17% moisture at the surface of the PVC sheet, the weight of water at the surface of the sheet is equal to 0.17%×weight of PVC. Now, the PVC weight can be determined by data previously cited as follows:

PVC weight=(sheet weight×window surface area)/sheet surface area

PVC weight=12.27×243/450.5=6.62 g.

The weight of water at the surface of the sheet is thus 6.62×0.17/100=0.0112 g. As the molecular weight of water is equal to 18 g, the number of moles of water n H$_2$O is equal to $6.25 \times 10^{-4}$.

According to equation (2), for the surface water to be converted into polyurea, it is necessary to have two MDI molecules react with one molecule of water. Hence, we deduce the number of moles n in the NCO group reacting with the moisture present at the PVC surface: $n_{NCO}=1.25 \times 10^{-3}$ mole. The total number of NCO moles is hence:

$7.36 \times 10^{-3} + 1.25 \times 10^{-3} = 8.63 \times 10^{-3}$ moles.

This number in fact represents a 11% increase over the number of moles of NCO in the absence of moisture. The weight ratio of polyol/MDI, in the presence of moisture, then becomes:

676.6/151.34=100/22.

With 0.17% moisture at the surface of the PVC sheet, thus, 22 g of MDI must be mixed with 100 g of polyol.

Finally, too great an excess of diisocyanate relative to the polyol adversely affects the quality of the bond as urea and biuret bridges are created, forming a screen between the polyurethane and the PVC.

As will be understood from the foregoing, the method of the invention has the advantage of being able to use a substrate having water molecules constantly present at its surface. This means that it is unnecessary to dry the substrate to have good adhesion. This avoids having to carry out a drying operation prior to adhesion, or a moisture-controlled atmosphere which would otherwise have been necessary to achieve the same degree of adhesion.

In the invention, any other catalyst able to fulfill the function claimed may be appropriate, such as very finely powdered tin octoate. However, catalysts of the soluble type are preferred to favor reactions which, in this case, occur in the homogeneous phase.

Although the invention in a preferred embodiment employs a final pressing step to obtain the best possible adhesion, it will be noted that the method of the invention implemented with no pressing step, namely by contact only, brings about an improvement in adhesion relative to the methods of the prior art also implemented without pressing on a moist substrate.

The invention of course aims to protect all structures, particularly a smart card structure, having at least one polyurethane network, for example in a layer, adhering to at least one polymer surface such as the surface of a sheet, said network and said adhesion being obtained according to the method described above.

What is claimed is:

1. Method of bonding a polyurethane surface to a polymer substrate that is able to create bonds to the polyurethane, said substrate containing surface moisture, comprising the steps of placing a resin on the substrate, said resin comprising a polyol and a diisocyanate, placing a layer of catalyst between the substrate and the resin, and pressing, wherein said catalyst chosen from the tertiary amines, said catalyst being able simultaneously to catalyze the reaction of the polyol with the diisocyanate to form the polyurethane and the reaction of the surface moisture with the diisocyanate to convert water molecules into polyurea.

2. Method according to claim 1, wherein the catalyst is diazobicyclo octane (Dabco).

3. Method according to claim 1 wherein the catalyst is dissolved in the polyol of the resin composition.

4. Method according to claim 1 wherein the substrate material is chosen from polymers having hydrogen bonds with polyurethane.

5. Method according to claim 4, wherein the substrate is selected from the group consisting of polyvinyl chloride (PVC), acrylonitrile-butadiene-styrene (ABS), and polycarbonate (PC).

6. Method according to claim 1 wherein in the presence of moisture, the number of moles of diisocyanate is approximately 5% to 15% greater than the number of moles of diisocyanate in the absence of moisture.

7. Card structure comprising a polyurethane network adhering to at least one sheet of polymer that is able to create bonds to the polyurethane, wherein said network and the adhesion are obtained by the method according to claim 1.

8. Method of bonding a polyurethane surface to a polymer substrate that is able to create bonds to the polyurethane, said substrate containing surface moisture, comprising the steps of placing a resin on the substrate, said resin comprising a polyol and a diisocyanate, and pressing, in the presence of a catalyst at the interphase between the substrate and the resin, wherein said catalyst chosen from the tertiary amines, said catalyst being able simultaneously to catalyze the reaction of the polyol with the diisocyanate to form a polyurethane network and the reaction of the surface moisture with the diisocyanate to convert water molecules into polyurea.

9. Method according to claim 8, wherein the catalyst is diazobicyclo octane (Dabco).

10. Method according to claim 8, wherein the polyol is a polyester-ether-polyol.

11. Method according to claim 8, wherein the diisocyanate is diphenylmethane diisocyanate.

12. Method according to claim 8, wherein the catalyst is dissolved in the polyol of the resin composition.

13. Method according to claim 8, wherein the substrate material is chosen from polymers that form hydrogen bonds with polyurethane.

14. Method according to claim 13, wherein the substrate is made of a polymer selected from the group consisting of polyvinyl chloride (PVC), acrylonitrile-butadiene-styrene (ABS), and polycarbonate (PC).

15. Method according to claim 14, wherein the substrate is polyvinyl chloride (PVC).

16. Card structure comprising a polyurethane network bonded to at least one sheet of polymer that is able to create bonds to the polyurethane, wherein said network and the bond are obtained according to the method of claim 8.

17. Card structure comprising a sheet of polyurethane, a sheet of polymer that is able to create bonds to the polyurethane, and a polyurethane network formed on sites between the sheets bonding the sheets together, said network containing a tertiary amine that catalyzed the formation of the network.

18. Card structure according to claim 17, wherein the polyurethane is formed by polycondensation of a polyol and a diisocyanate.

19. Card structure according to claim 18, wherein the polyurethane is formed by polycondensation of a polyol and a diisocyanate.

20. Card structure according to claim 18, wherein the polymer is selected from the groups consisting of polyvinyl chloride (PVC), acrylonitrile-butadiene-styrene (ABS), and polycarbonate (PC).

21. Card structure according to claim 20, wherein the polymer is polyvinyl chloride (PVC).

22. Card structure according to claim 18, wherein the card structure is a smart card.

* * * * *